United States Patent
Ito et al.

(10) Patent No.: US 10,583,525 B2
(45) Date of Patent: Mar. 10, 2020

(54) LASER PROCESSING MACHINE

(71) Applicant: AMADA HOLDINGS CO., LTD., Kanagawa (JP)

(72) Inventors: Ryohei Ito, Kanagawa (JP); Hiroaki Ishiguro, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/089,770

(22) PCT Filed: Dec. 13, 2016

(86) PCT No.: PCT/JP2016/086974
§ 371 (c)(1),
(2) Date: Sep. 28, 2018

(87) PCT Pub. No.: WO2017/168857
PCT Pub. Date: Oct. 5, 2017

(65) Prior Publication Data
US 2019/0084082 A1 Mar. 21, 2019

(30) Foreign Application Priority Data
Apr. 1, 2016 (JP) .................................. 2016-073906

(51) Int. Cl.
*B23K 26/06* (2014.01)
*B23K 26/046* (2014.01)

(52) U.S. Cl.
CPC ........ *B23K 26/0648* (2013.01); *B23K 26/046* (2013.01); *B23K 26/06* (2013.01)

(58) Field of Classification Search
CPC ... B23K 26/046; B23K 26/0648; B23K 26/06
See application file for complete search history.

(56) References Cited

U.S. PATENT DOCUMENTS 9,250,390 B2   2/2016  Muendel et al.
9,823,422 B2  11/2017  Muendel et al.
(Continued)

FOREIGN PATENT DOCUMENTS

CN    104136952 A    11/2014
DE    102011117607   5/2013
(Continued)

OTHER PUBLICATIONS

Official Communication issued in International Bureau of WIPO Patent Application No. PCT/JP2016/086974, dated Feb. 28, 2017, along with English translation.
(Continued)

*Primary Examiner* — Ibrahime A Abraham
*Assistant Examiner* — John J Norton
(74) *Attorney, Agent, or Firm* — Greenblum & Bernstein, P.L.C.

(57) ABSTRACT

A laser processing machine includes a beam parameter product variable device, and a beam diameter variable device. The beam parameter product variable device sets beam parameter products of a laser beam to a predetermined value. The beam diameter variable device includes a first lens that is movable in an optical axis direction and having a positive focal length, and converts divergent light of a laser beam emitted from an emission end of the laser beam into convergent light, and a second lens that is movable in the optical axis direction and having a negative focal length on which the convergent light is incident. A third lens having a positive focal length, focuses the laser beam emitted from the beam diameter variable device, and irradiates a plate material with the focused laser beam.

7 Claims, 8 Drawing Sheets

(56) References Cited

U.S. PATENT DOCUMENTS

| | | | |
|---|---|---|---|
| 2007/0193984 A1 | 8/2007 | Kawai et al. | |
| 2010/0174273 A1 | 7/2010 | Murakami | |
| 2013/0044371 A1* | 2/2013 | Rupp | B23K 26/046 |
| | | | 359/432 |
| 2013/0148925 A1 | 6/2013 | Muendel et al. | |
| 2018/0154481 A1* | 6/2018 | Valentin | B23K 26/046 |

FOREIGN PATENT DOCUMENTS

| | | |
|---|---|---|
| JP | S58-57385 | 4/1983 |
| JP | 2006-218487 | 8/2006 |
| JP | 2013-202675 A | 10/2013 |
| JP | 2015-500571 | 1/2015 |

OTHER PUBLICATIONS

Chinese Official Action dated Mar. 22, 2019 in the counterpart Chinese Patent application No. 201680084374.3.

* cited by examiner

LASER PROCESSING MACHINE

TECHNICAL FIELD

The present disclosure relates to a laser processing machine that cuts a plate material formed of metal using a laser beam.

BACKGROUND ART

A laser processing machine has been widely used that cuts a plate material formed of metal using a laser beam emitted from a laser oscillator. In the laser processing machine, various laser oscillators are used. In order to cut a plate material with a high speed having a relatively thin plate thickness, a fiber laser oscillator is frequently used, for example. The fiber laser oscillator not only has an advantage in that it is suitable for high-speed cutting of a plate material, but also has an advantage in that it has a smaller size and lower costs than a $CO_2$ laser oscillator.

CITATION LIST

Patent Literature

[Patent Literature 1]: German Patent Application Publication No. 10 2011 117 607 A1
[Patent Literature 2]: Japanese Translation of PCT International Application Publication No. JP-T-2015-500571

SUMMARY OF THE INVENTION

Among plate materials having relatively thin plate thicknesses, a plate material having a plate thickness of 6 mm to 30 mm, for example, is called a "thick plate", and a plate material having a plate thickness of 0.1 mm to 6 mm, for example, is called a "thin plate". In the industry, a plate material having a plate thickness of 2 mm to 12 mm, for example, is also sometimes called a "medium thick plate". It is difficult to cut a thick plate and a thin plate using the same laser processing machine by changing the processing conditions. The processing conditions described herein include the power of a laser beam, a pulse duty cycle during the pulse oscillation of a laser beam, a focal position, and the type of assist gas or gas pressure, for example.

Therefore, in the conventional laser processing machine, in order to cut both a thick plate and a thin plate, it is necessary to replace a component of a laser processing machine such as an optical element such as a lens or the like, or a processing nozzle. The replacement of a component is complicated, which causes an increase in costs. Therefore, a laser processing machine is desired that can cut both a thick plate and a thin plate without replacing a component.

An object of an embodiment is to provide a laser processing machine that can cut a plate material having a plate thickness in a predetermined range without replacing a component.

An aspect of an embodiment provides a laser processing machine including: a beam parameter product variable device configured to vary beam parameter products of a laser beam emitted by a laser oscillator; and a beam diameter variable device configured to change a beam diameter of the laser beam emitted by the beam parameter product variable device, wherein the beam parameter product variable device sets beam parameter products of the laser beam to a predetermined value, the beam diameter variable device includes: a first lens that is movable in an optical axis direction and having a positive focal length, and configured to convert divergent light of a laser beam emitted from an emission end of the laser beam into convergent beam light; and a second lens that is movable in the optical axis direction and having a negative focal length on which the convergent light is incident, the second lens is disposed at a position, which is shifted from a position where the convergent light is focused toward the first lens side by the same distance as the focal length of the second lens according to a position of the first lens in the optical axis direction, and is configured to convert the convergent light into parallel light, and the laser processing machine further comprises a third lens having a positive focal length, configured to focus the laser beam emitted from the beam diameter variable device, and to irradiate a plate material with the focused laser beam.

It is preferable that the laser processing machine further includes: a first moving mechanism for moving the first lens; a second moving mechanism for moving the second lens; a first driver configured to drive the first moving mechanism; a second driver configured to drive the second moving mechanism; and a controller configured to control the first and second drivers so as to move the first and second lenses, respectively, according to a processing condition of the plate material.

In the laser processing machine, it is preferable that the controller controls the beam parameter product variable device so as to change the beam parameter products of the laser beam.

The controller controls the first and second drivers to increase a beam diameter of the laser beam incident on the third lens so as to decrease a focused beam diameter as a plate thickness of the plate material is thinner, and to decrease the beam diameter of the laser beam incident on the third lens so as to increase the focused beam diameter as a plate thickness of the plate material is thicker. Even when the first and second drivers move the first lens and the second lens, respectively, a focal position of the laser beam emitted from the third lens and focused on the plate material is fixed.

In the laser processing machine, it is preferable that the third lens is configured to be movable in the optical axis direction, and to change a focal position of the laser beam.

It is preferable that the laser processing machine further includes: a first moving mechanism for moving the first lens; a second moving mechanism for moving the second lens; a third moving mechanism for moving the third lens; a first driver configured to drive the first moving mechanism; a second driver configured to drive the second moving mechanism; a third driver configured to drive the third moving mechanism; and a controller configured to control the first driver, the second driver, and the third driver so as to move the first lens, the second lens, and the third lens, respectively, according to a processing condition of the plate material.

In the laser processing machine, it is preferable that the controller controls the beam parameter product variable device so as to change the beam parameter products of the laser beam.

In accordance with the laser processing machine according to an embodiment, a plate material having a plate thickness in a predetermined range can be cut without replacing a component.

MODES FOR CARRYING OUT THE INVENTION

Figure 1:
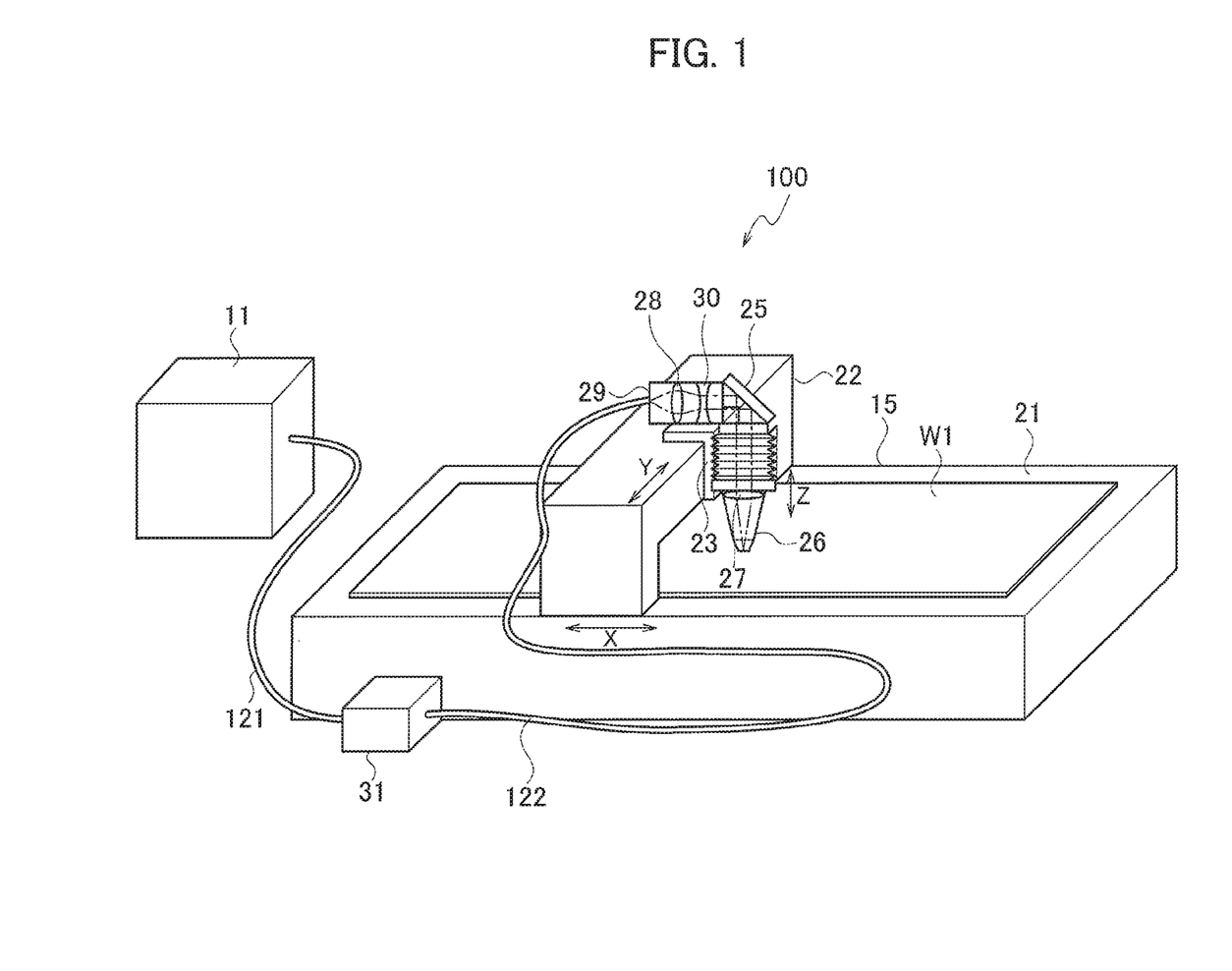
FIG. 1 is a perspective view illustrating an overall configuration example of a laser processing machine according to an embodiment.

Hereinafter, a laser processing machine according to an embodiment will be described with reference to the accompanying drawings. In FIG. 1, a laser processing machine 100 includes: a laser oscillator 11 that generates and emits a laser beam; a beam parameter product variable device 31 that varies beam parameter products of the laser beam emitted by the laser oscillator 11; and a laser processing unit 15. Hereinafter, the beam parameter products are referred to as "BPP", and the beam parameter product variable device 31 is referred to as a "BPP variable device 31".

The laser oscillator 11 and the BPP variable device 31 are connected to each other through a feeding fiber 121, and the feeding fiber 121 transmits the laser beam emitted by the laser oscillator 11 to the BPP variable device 31.

The BPP variable device 31 and the laser processing unit 15 are connected to each other through a process fiber 122, and the process fiber 122 transmits the laser beam emitted by the BPP variable device 31 to the laser processing unit 15. The process fiber 122 is mounted along cable ducts (not illustrated) of an X-axis and a Y-axis disposed in the laser processing unit 15.

The laser processing machine 100 cuts a plate material W1 formed of metal using the laser beam emitted from the laser oscillator 11.

As the laser oscillator 11, a laser oscillator is preferable that amplifies an excitation beam emitted from a laser diode to emit a laser beam having a predetermined wavelength, or a laser oscillator that directly uses a laser beam emitted from a laser diode. Examples of the laser oscillator 11 include a solid laser oscillator, a fiber laser oscillator, a disk laser oscillator, and a direct diode laser oscillator (DDL oscillator).

The laser processing unit 15 includes: a processing table 21 on which the plate material W1 is placed; a gate-type X-axis carriage 22 that is movable on the processing table 21 in an X-axis direction; and a Y-axis carriage 23 that is movable on the X-axis carriage 22 in a Y-axis direction perpendicular to the X-axis. In addition, the laser processing unit 15 includes a collimator unit 29 that is fixed to the Y-axis carriage 23.

The collimator unit 29 includes: a convex lens 28 on which a laser beam emitted from the emission end of the process fiber 12 is incident; and a concave lens 30 on which the laser beam emitted from the convex lens 28 is incident.

In addition, the collimator unit 29 includes: a bend mirror 25 that reflects the laser beam emitted from the concave lens 30 downward in a Z-axis direction perpendicular to the X-axis and the Y-axis; a focusing lens that focuses the laser beam reflected from the bend mirror 25; and a processing head 26.

The convex lens 28 is a lens having a positive focal length, the concave lens 30 is a lens having a negative focal length, and the focusing lens 27 is a lens having a positive focal length. The focusing lens 27 is a convex lens. The convex lens 28 and the concave lens 30 function as collimating lenses that collimate each of the incident laser beams.

As described below, the convex lens 28, the concave lens 30, and the focusing lens 27 are configured to be movable in an optical axis direction. The convex lens 28 and the concave lens 30 constitute a beam diameter variable device 32 (see FIG. 5 or 6) which varies the beam diameter.

The convex lens 28, the concave lens 30, the bend mirror 25, the focusing lens 27, and the processing head 26 are disposed in the collimator unit 29 in a state where an optical axis is adjusted in advance.

The collimator unit 29 is fixed to the Y-axis carriage 23 that is movable in the Y-axis direction, and the Y-axis carriage 23 is provided in the X-axis carriage 22 that is movable in the X-axis direction. Accordingly, the laser processing unit 15 can move the position, where the plate material W1 is irradiated with the laser beam emitted from the processing head 26, in the X-axis direction and the Y-axis direction.

With the above-described configuration, the laser processing machine 100 can transmit the laser beam emitted from the laser oscillator 11 to the laser processing unit 15 through the BPP variable device 31, and can irradiate the plate material W1 with the laser beam focused by the focusing lens 27 to cut the plate material W1. In FIG. 1, the BPP variable device 31 is provided outside the laser oscillator 11, but the BPP variable device 31 may be provided inside the casing of the laser oscillator 11.

When the plate material W1 is cut, assist gas is blown to the plate material W1 to remove molten material therefrom. FIG. 1 does not illustrate a configuration of blowing the assist gas.

Figure 2:
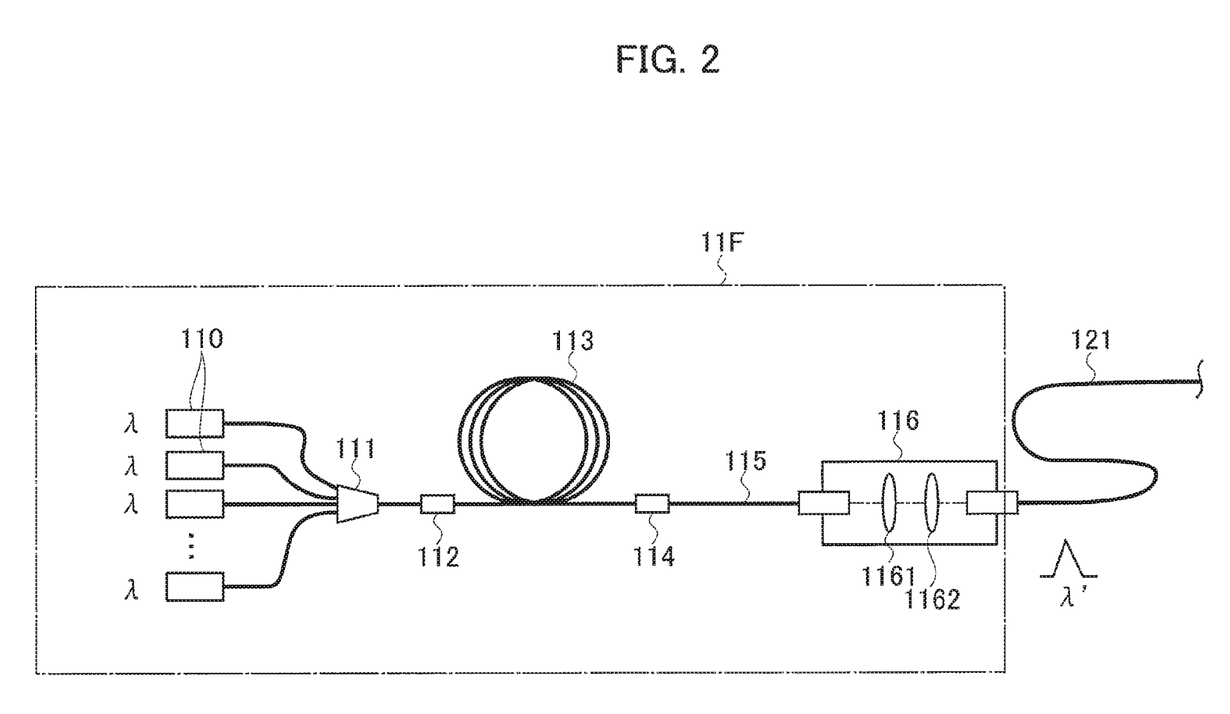
FIG. 2 is a diagram illustrating a schematic configuration in which a laser oscillator 11 illustrated in FIG. 1 is configured as a fiber laser oscillator 11F.

FIG. 2 illustrates a schematic configuration in which the laser oscillator 11 is configured as a fiber laser oscillator 11F. In FIG. 2, each of the plurality of laser diodes 110 emits a laser beam having a wavelength $\lambda$. An excitation combiner 111 spatially combines laser beams emitted from the laser diodes 110.

The laser beam emitted from the excitation combiner 111 is incident on a Yb-doped fiber 113 between two Fiber Bragg Gratings (FBGs) 112 and 114. The Yb-doped fiber 113 is a fiber in which Yb (ytterbium), as a rare earth element, is added to the core.

The laser beam incident on the Yb-doped fiber 113 repeatedly reciprocates between the FBGs 112 and 114, and a laser beam having a wavelength $\lambda'$ of about 1060 nm to 1080 nm (1 μm band), which is different from the wavelength $\lambda$, is emitted from the FBG 114. The laser beam emitted from the FBG 114 is incident on the process fiber 12 through a feeding fiber 115 and a beam coupler 116. The beam coupler 116 includes lenses 1161 and 1162.

Figure 3:
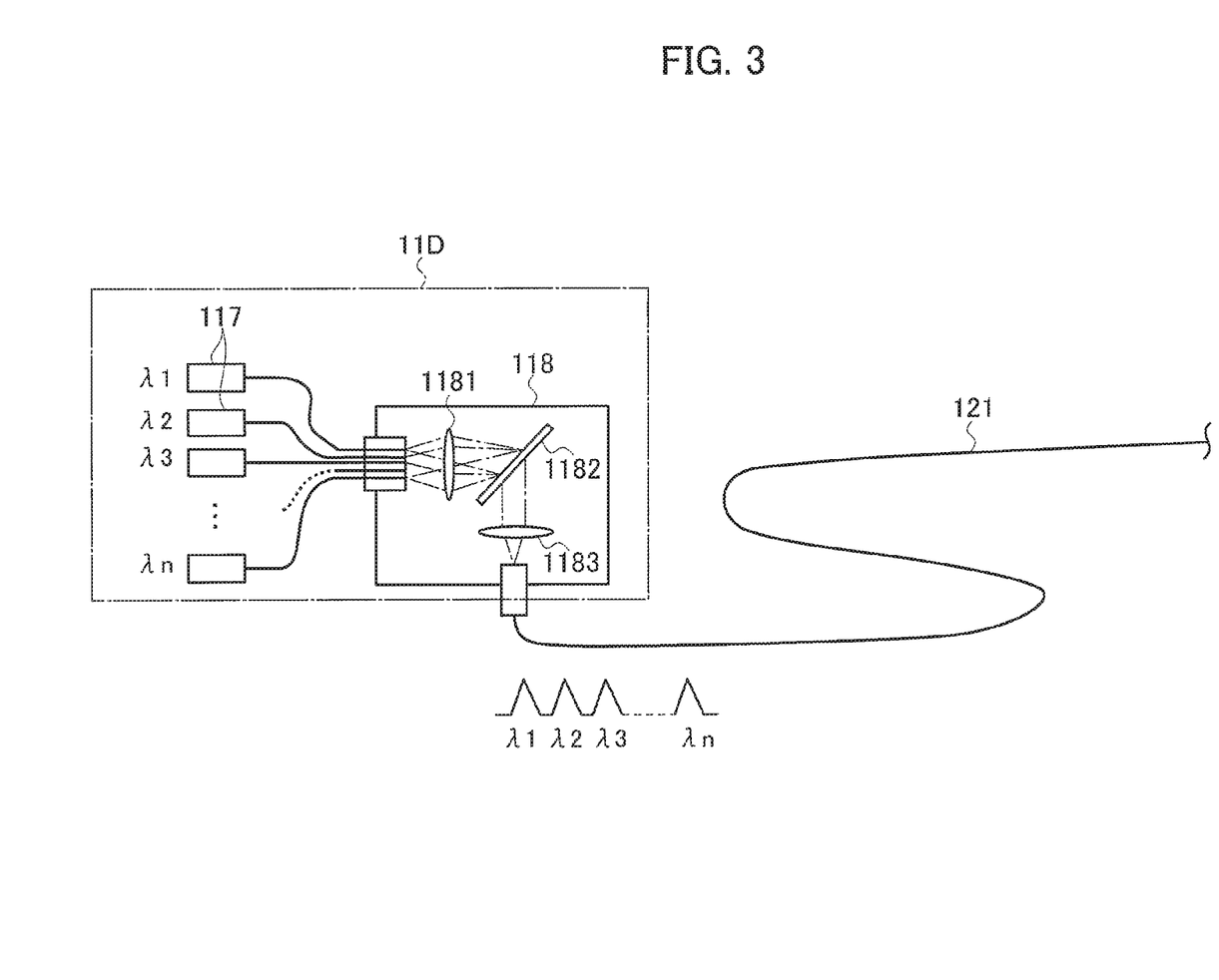
FIG. 3 is a diagram illustrating a schematic configuration in which the laser oscillator 11 illustrated in FIG. 1 is configured as a direct diode laser oscillator 11D.

FIG. 3 illustrates a schematic configuration in which the laser oscillator 11 is configured as a DDL oscillator 11D. In FIG. 3, a plurality of laser diodes 117 emit laser beams having different wavelengths $\lambda 1$ to $\lambda n$. The wavelengths $\lambda 1$ to $\lambda n$ (wavelength range of shorter than 1 μm band) are in a range of 910 nm to 950 nm, for example.

An optical box 118 spatially combines the laser beams having the wavelengths λ1 to λn emitted from the laser diodes 117. The optical box 118 includes a collimating lens 1181, a grating 1182, and a focusing lens 1183.

The collimating lens 1181 collimates the laser beams having the wavelengths λ1 to λn. The grating 1182 bends directions of the collimated laser beams by 90 degrees and allows the collimated laser beams to be incident on the focusing lens 1183. The focusing lens 1183 focuses the incident laser beams and allows the laser beams to be incident on the feeding fiber 121.

Figure 4:
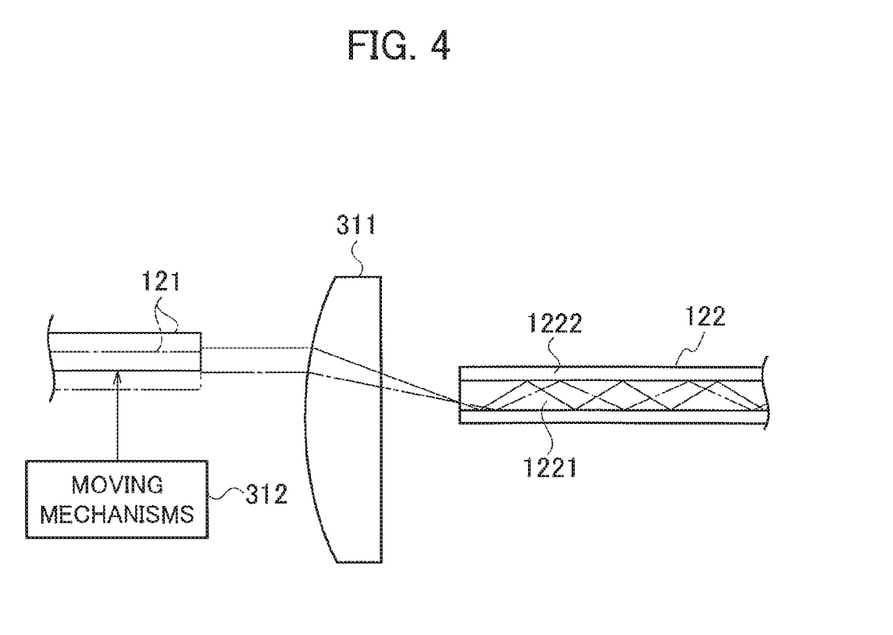
FIG. 4 is a diagram illustrating a configuration example of a beam parameter product variable device 31 illustrated in FIG. 1.

With reference to FIG. 4, a configuration example of the BPP variable device 31 will be described. The BPP variable device 31 includes a focusing lens 311 disposed between an emission end of the feeding fiber 121 and an incident end of the process fiber 122, and a moving mechanism 312 that moves the position of the end of the feeding fiber 121.

As illustrated in FIG. 4, the process fiber 122 is configured such that the periphery of a core 1221 is covered by a cladding 1222. The refractive index of the core 1221 is higher than that of the cladding 1222. The feeding fiber 121 has the same configuration.

When the moving mechanism 312 moves the position of the end of the feeding fiber 121 with respect to the focusing lens 311, the position in the focusing lens 311 on which the laser beam is incident changes, thereby the focusing lens 311 changes the incident angle of the laser beam incident on the core 1221 of the process fiber 122.

When the feeding fiber 121 is positioned indicated by a solid line, the laser beam proceeds as shown by a solid line, and when the feeding fiber 121 is positioned indicated by an alternate long and short dashed line, the laser beam proceeds as shown by an alternate long and short dashed line. As a result, BPP of the laser beam emitted by the process fiber 122 varies.

The BPP variable device 31 is not limited to the configuration illustrated in FIG. 4, and may have any configuration as long as that BPP can be varied. A configuration may be adopted in which the position of the feeding fiber 121 is fixed, and the incident angle of the laser beam incident on the process fiber 122 is changed by moving the lens. Further, a lens may be provided in the incident end of the process fiber 122.

Figure 5:
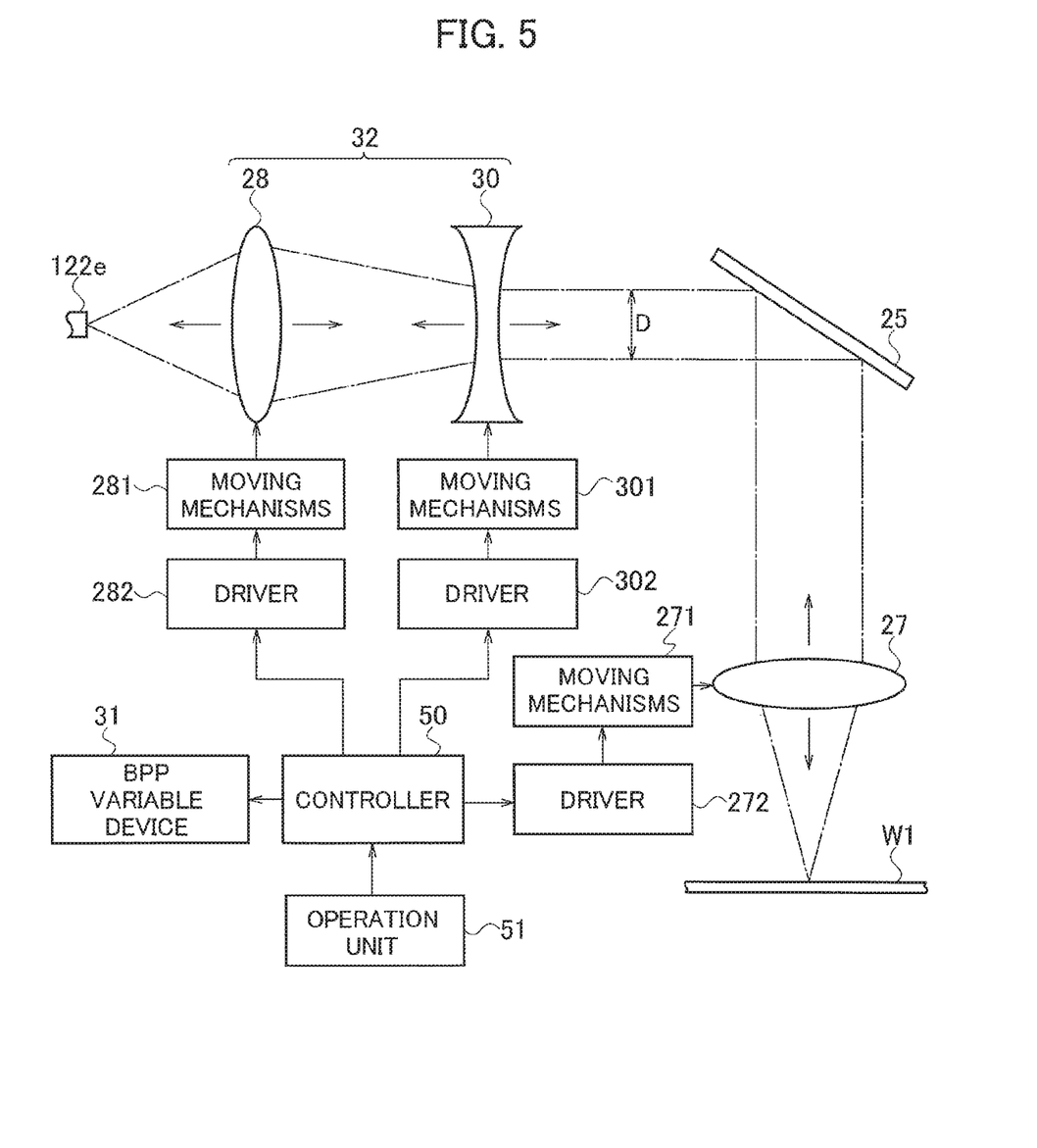
FIG. 5 is a diagram illustrating a schematic configuration example in which a convex lens 28, a concave lens 30, and a focusing lens 27 illustrated in FIG. 1 are movable.

A schematic configuration example in which the convex lens 28, the concave lens 30, and the focusing lens 27 are movable will be described using FIG. 5. In FIG. 5, the convex lens 28 and the concave lens 30 which constitute the beam diameter variable device 32 are respectively attached to moving mechanisms 281 and 301 for allowing the convex lens 28 and the concave lens 30 to be movable in the optical axis direction (the X-axis direction in FIG. 1). The focusing lens 27 is attached to a moving mechanism 271 for allowing the focusing lens 27 to be movable in the optical axis direction (the Z-axis direction in FIG. 1).

The moving mechanisms 281, 301, and 271 may be any mechanism as long as each of the convex lens 28, the concave lens 30, and the condenser lens 27 is movable using any one of a gear, a belt, a rack and pinion, a worm gear, a ball screw, and the like (or an arbitrary combination thereof), for example.

The convex lens 28, the concave lens 30, and the focusing lens 27 move in the direction of the optical axis as indicated by the arrows, in such a way that the drivers 282, 302, and 272 drive the moving mechanisms 281, 301, and 271, respectively. The drivers 282, 302, and 272 are motors, for examples.

A controller 50 controls the drivers 282, 302, and 272. The controller 50 can be constituted by a microprocessor. The controller 50 may be an NC device that controls the entire portion of the laser processing machine 100.

An operator can set various processing conditions such as the kind of material of the plate material W1, the plate thickness of the plate material W1, a focused beam diameter of a laser beam, or a focal position by operating an operation unit 51. Examples of the material of the plate material W1 include iron, stainless steel, aluminum, copper, and brass. The plate thickness of the plate material W1 is a value in a predetermined range of 0.1 mm to 30 mm, for example.

The controller 50 controls the driving of the moving mechanisms 281 and 301 by the drivers 282 and 302, so as to adjust the positions of the convex lens 28 and the concave lens 30 according to the processing condition of the plate material W1 input by the operation unit 51.

In a case where the focused beam diameter of the laser beam is input by the operation unit 51, the controller 50 controls the drivers 282 and 302, so as to adjust the positions of the convex lens 28 and the concave lens 30 according to the input focused beam diameter.

Even when the focused beam diameter of the laser beam is not input, as long as the kind of material of the plate material W1 and the plate thickness are input, an optimum focused beam diameter is substantially determined. In a case where the kind of material of the plate material W1 and the plate thickness are input by the operation unit 51, the controller 50 can control the drivers 282 and 302 so as to adjust the positions of the convex lens 28 and the concave lens 30 according to a focused beam diameter corresponding to the kind of the input material and the input plate thickness.

The controller 50 may obtain a necessary focused beam diameter by calculation based on the processing conditions, or may read a pre-stored focused beam diameter corresponding to each of the processing conditions.

In a case where the focal position is input by the operation unit 51, the controller 50 controls the driving of the moving mechanisms 271 by the driver 272, so as to adjust the position of the focusing lens 27 according to the input focal position.

In FIG. 4, a laser beam is emitted from an emission end 122e of the process fiber 12 as divergent light as indicated by an alternate long and short dashed line.

The convex lens 28 is disposed in such a way that the distance from the emission end 122e to the convex lens 28 is equal to or greater than the focal length of the convex lens 28. Accordingly, the convex lens 28 converts the divergent light of the laser beam into convergent light. The controller 50 can move the convex lens 28 in the optical axis direction under the condition that the distance from the emission end 122e to the convex lens 28 is equal to or greater than the focal length of the convex lens 28.

In a case where the concave lens 30 is disposed at an optimum position described below, the concave lens 30 converts the convergent light into parallel light. The parallel light described herein represents that a laser beam flux is parallel light. The parallel light emitted from the concave lens 30 is reflected by the bend mirror 25 and the optical path is bent, and the reflected laser beam is incident on the focusing lens 27. The focusing lens 27 focuses the parallel light so that the focal position is on or near the surface of the plate material W1, and irradiates the plate material W1 with a focused laser beam.

The controller 50 may control the BPP variable device 31 to vary BPP.

With reference to (a) to (c) of FIG. 6, the operation of the beam diameter variable device 32 will be described. (a) to (c) of FIG. 6 schematically illustrates a state where the convex lens 28, the concave lens 30, and the focusing lens 27 are arranged so that the optical axis is in a straight line, omitting the bend mirror 25 in FIG. 5.

Figure 6:
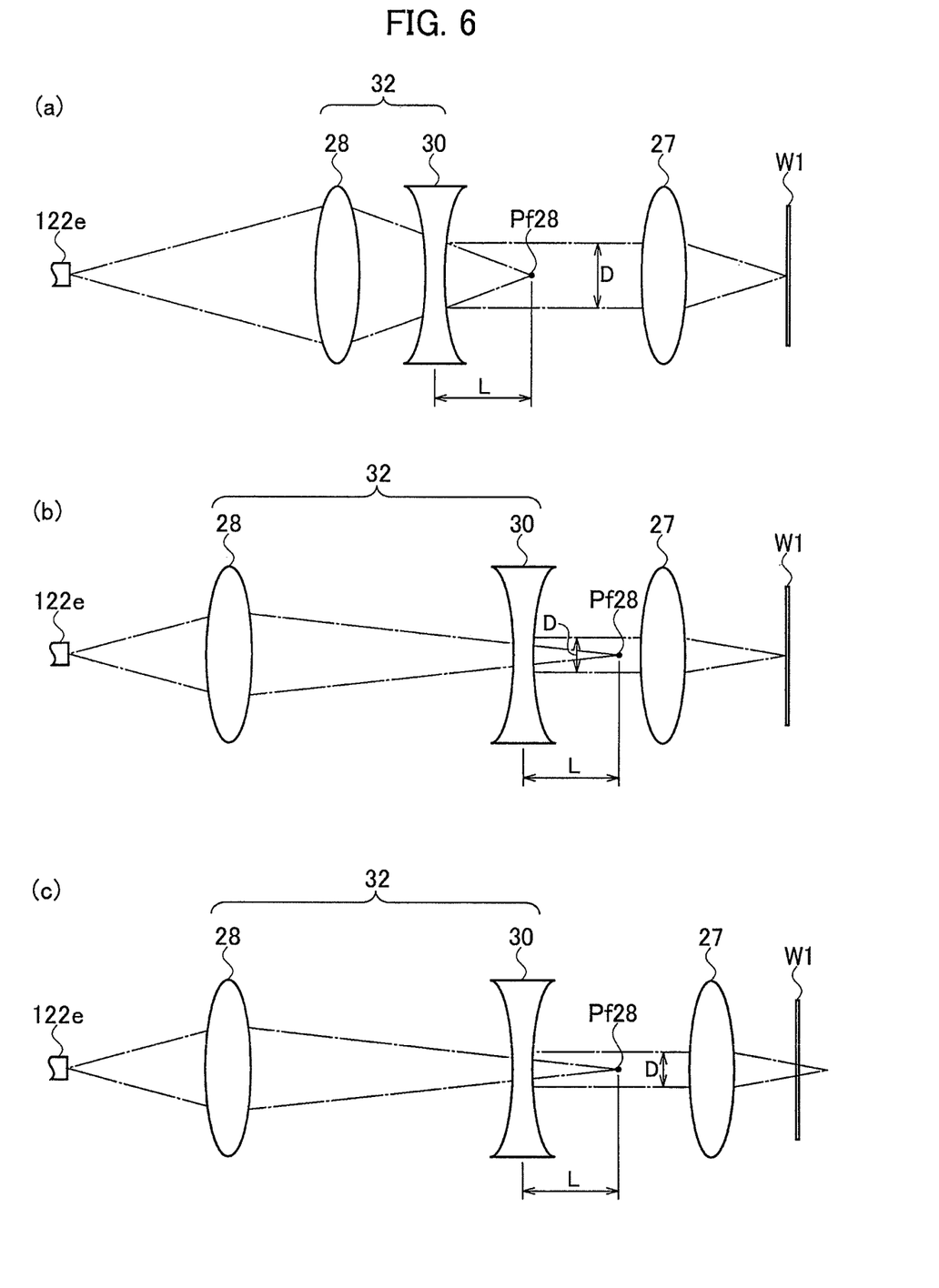
FIG. 6 is diagram illustrating a method of moving the convex lens 28, the concave lens 30, and the focusing lens 27.

In (a) to (c) of FIG. 6, it is assumed that the concave lens 30 is not present, and a position where the convergent light emitted from the convex lens 28 is focused at a point Pf28. In a case where the concave lens 30 is positioned at the position that is shifted from the point Pf28 toward the convex lens 28 side by the same distance L as the focal length of the concave lens 30, the concave lens 30 converts the convergent light into parallel light.

As illustrated in (a) and (b) of FIG. 6 a beam diameter D of the parallel light emitted from the concave lens 30 varies depending on a convergence angle of the convergent light emitted from the convex lens 28.

Figure 7:
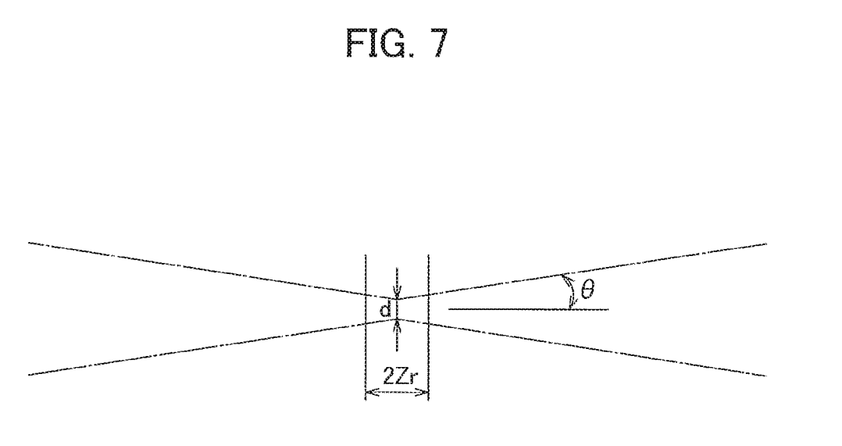
FIG. 7 is a diagram illustrating a focused beam diameter and a divergence angle of a laser beam.

FIG. 7 is an enlarged view schematically illustrating the periphery of the beam waist of the laser beam focused on or near the surface of the plate material W1. In FIG. 7, the left side is the upper side of the plate material W1, and the right side is the lower side of the plate material W1.

A focused beam diameter d is represented by Equation (1). A Rayleigh length Zr is represented by Equation (2). In Equations (1) and (2), f represents a focal length of the focusing lens 27. Note that BPP is expressed by the product of a radius d/2 of the beam waist and a half width at half maximum θ of a divergence angle of the beam.

$$d = \frac{4 \cdot BPP \cdot f}{D} \quad (1)$$

$$Zr = \frac{4 \cdot BPP \cdot f^2}{D^2} \quad (2)$$

BPP does not change even when the convex lens 28 and the concave lens 30 are moved, or when the focusing lens 27 is moved. When it is assumed that BPP is not varied by the BPP variable device 31, based on Equations (1) and (2), the focused beam diameter d and the Rayleigh length Zr are determined according to the beam diameter D, and when the beam diameter D changes, the focused beam diameter d and the Rayleigh length Zr change.

As the beam diameter D increases, the focused beam diameter d and the Rayleigh length Zr decrease, the power density increases, and a beam profile suitable for a thin plate is obtained. As the beam diameter D decreases, the focused beam diameter d and the Rayleigh length Zr increase, the power density decreases, and a beam profile suitable for a thick plate is obtained.

The controller 50 calculates the beam diameter D corresponding to the target focused beam diameter d based on the Equation (1), and controls the drivers 282 and 302 to move the convex lens 28 and the concave lens 30, in such a way that the convex lens 28 and the concave lens 30 are positioned at positions where the calculated beam diameter D is realized.

Specifically, the controller 50 causes the convex lens 28 to be moved in such a way that the convergence angle of the laser beam emitted from the convex lens 28 matches the convergence angle at which the target beam diameter D is obtained. In addition to this, the controller 50 causes the concave lens 30 to be moved to the position shifted from the point Pf28 toward the convex lens 28 side by the distance L, in such a way that the concave lens 30 converts the convergent light into parallel light according to the position of the convex lens 28 in the optical axis direction.

The controller 50 calculates positions of the convex lens 28 and the concave lens 30 at which the target beam diameter D and the target focused beam diameter d are obtained, and cause the convex lens 28 and the concave lens 30 to be moved to the calculated positions.

As can be seen from (a) and (b) of FIG. 6, since the focusing lens 27 focuses the parallel light, the focal position of the laser beam does not change even when the position of the concave lens 30 changes.

As described above, the controller 50 controls the drivers 282 and 302 in such a way that the beam diameter D of the laser beam incident on the focusing lens 27 is increased so as to decrease the focused beam diameter d as the plate thickness of the plate material W1 decreases, and that the beam diameter D of the laser beam incident on the focusing lens 27 is decreased so as to increase the focused beam diameter d as the plate thickness of the plate material W1 increases. Even when the drivers 282 and 302 move the convex lens 28 and the concave lens 30, respectively, the focal position of the laser beam emitted from the focusing lens 27 and focused on the plate material W1 is fixed and does not change.

Note that the beam intensity distribution in the beam diameter D is formed by reflection synthesis of a laser beam transmitted to the core and the cladding of the process fiber 12. As illustrated in (a) and (b) of FIG. 6, even when the beam diameter D changes, the beam intensity distribution hardly changes; even when the beam intensity distribution in the beam diameter D changes, this change is extremely small.

As illustrated in (c) of FIG. 6, when the controller causes the focusing lens 27 to be moved, the focal position can be changed. Instead of setting the surface of the plate material W1 as the focal position, a position slightly shifted from the surface or the back of the plate material W1 may be set as the focal position for cutting.

In a case where the focal position is input by the operation unit 51, the controller 50 control the driver 272 to move the focusing lens 27 so that the focal position matches the input focal position; even when the focusing lens 27 is moved to change the focal position, the focused beam diameter d does not change.

Figure 8:
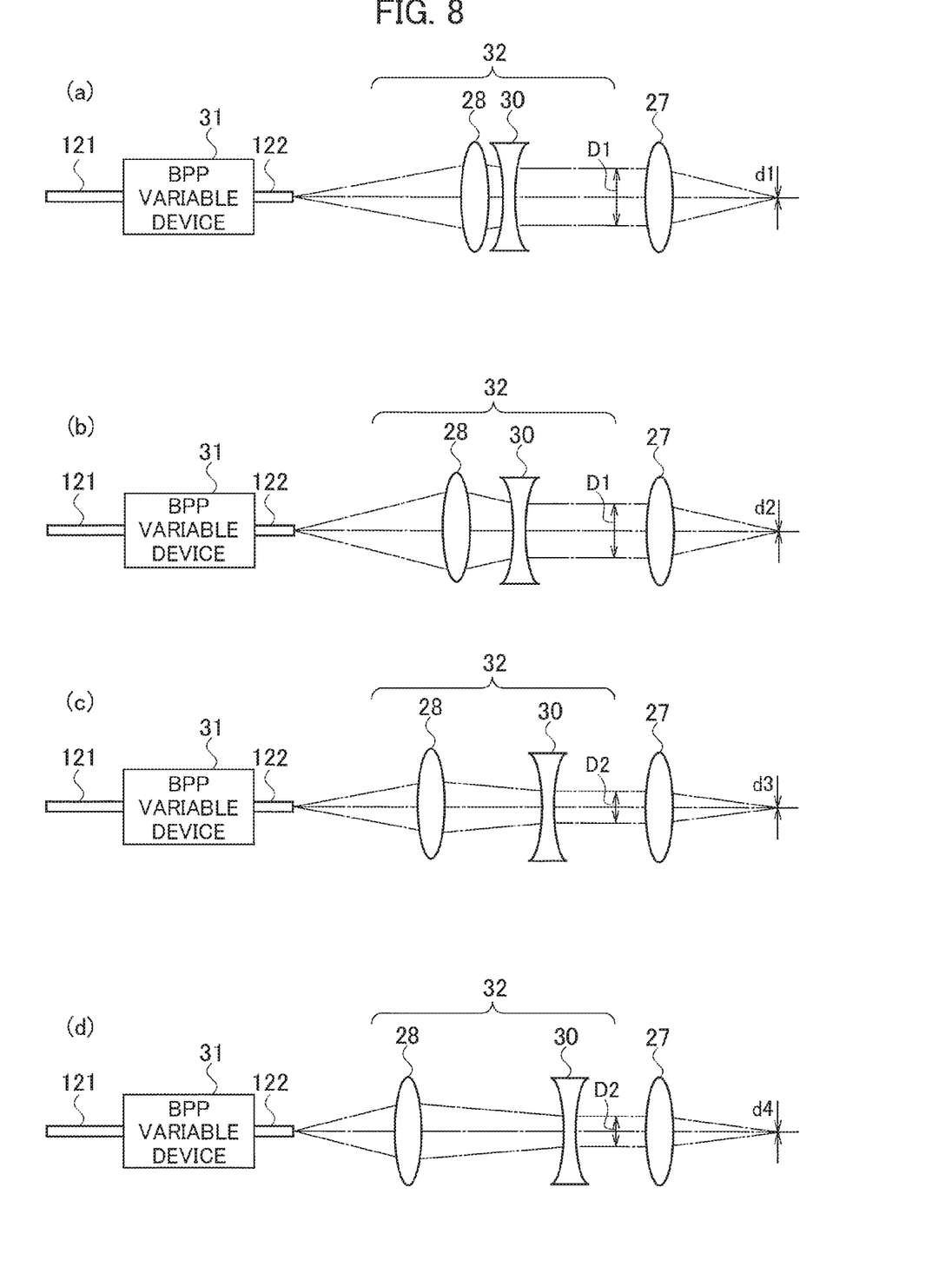
FIG. 8 is a diagram illustrating an operation of the beam parameter product variable device 31.

Next, the operation of the BPP variable device 31 will be described with reference to (a) to (d) of FIG. 8. Based on Equations (1) and (2), the focused beam diameter d and the Rayleigh length Zr change according to BPP. The beam diameter D1 illustrated in (a) and (b) of FIG. 8 is the maximum allowable diameter in the focusing lens 27. The controller 50 is supposed to control the BPP variable device 31 in such a way that BPP in (a) of FIG. 8 becomes smaller than BPP in (b) of FIG. 8.

When the BPP variable device 31 varies BPP, since a divergence angle of the laser beam becomes large, in order to make the beam diameter D common to the beam diameter D1, it is necessary to change the positions of the convex lens 28 and the concave lens 30. The reason why the positions of the convex lens 28 and the concave lens 30 are different in (a) and (b) of FIG. 8 is that the beam diameter D is made common to the beam diameter D1 while varying BPP.

BPP in (a) of FIG. 8 is made smaller than BPP in (b) of FIG. 8 by the BPP variable device 31, and thus it is possible to make the focused beam diameter d in (a) of FIG. 8 smaller than that of in (b) of FIG. 8. When it is assumed that the focused beam diameter d in (a) of FIG. 8 is "d1", and the focused beam diameter d in (b) of FIG. 8 is "d2", the relation of d1<d2 is formed.

A beam diameter D2 illustrated in (c) and (d) of FIG. 8 is the minimum allowable diameter in the focusing lens 27. The minimum allowable diameter is determined by the influence of the thermal lens or the light resistance of the coating of the focusing lens 27. The controller 50 is supposed to control the BPP variable device 31 in such a way that BPP in (d) of FIG. 8 becomes larger than that of in (c) of FIG. 8.

Similarly, the reason why the positions of the convex lens 28 and the concave lens 30 are different in (c) and (d) of FIG. 8 is that the beam diameter D is made common to the beam diameter D2 while varying BPP.

BPP in (d) of FIG. 8 is made larger than BPP in (c) of FIG. 8 by the BPP variable device 31, and thus it is possible to make the focused beam diameter d in (d) of FIG. 8 larger than that of in (c) of FIG. 8. When it is assumed that the focused beam diameter d in (c) of FIG. 8 is "d3" and the focused beam diameter d in (d) of FIG. 8 is "d4", the relation of d3<d4 is formed.

The controller 50 may control the BPP variable device 31 so that BPP becomes a predetermined value, and may control drivers 282 and 302 so as to determine the positions of the convex lens 28 and the concave lens 30 to have a desired beam diameter D.

In the laser processing machine 100 according to an embodiment, the BPP variable device 31 and the beam diameter variable device 32 are provided, and thus it is possible to change the focused beam diameter d only with the BPP variable device 31, and it is possible to change the focused beam diameter d only with the beam diameter variable device 32. In addition, it is also possible to change the focused beam diameter d with both the BPP variable device 31 and the beam diameter variable device 32.

As illustrated in (a) to (d) in FIG. 8, it is assumed that the beam diameter D changes in a range from the beam diameter D1 of the maximum value to the beam diameter D2 of the minimum value. It is assumed that the BPP variable device 31 varies the value of BPP in a range from BPP1 to BPP2. The value of BPP is BPP1 in (a) and (c) of FIG. 8, and the value of BPP is BPP2 in (b) and (d) in FIG. 8.

In this case, if the value of BPP is fixed to BPP1, the focused beam diameter d changes in a range from d1 to d3, and if the value of BPP is fixed to BPP2, the focused beam diameter d changes in a range from d2 to d4. In the laser processing machine 100 according to an embodiment, it is possible to change the focused beam diameter d in a range from d1 to d4 by varying BPP.

It is possible to change the focused beam diameter d by changing at least one of BPP and the beam diameter D. When both BPP and the beam diameter D are changed, the focused beam diameter d can be changed in a wide range.

In accordance with the laser processing machine 100 according to an embodiment, since the BPP variable device 31 and the beam diameter variable device 32 are provided and thus the focused beam diameter d can be adjusted in a wide range, it is possible to widen a range of the plate thickness in which the cutting is appropriately performed.

If the variable range of BPP by the variable device 31 is set to 1.5 to 5 mm mrad (that is, 1 to 3.33 times) and the variable range of the beam diameter D by the beam diameter variable device 32 is set to 1 to 3 times, it is possible to vary the focused beam diameter d 1 to 10 times by Equation (1). If the variable range of BPP is set wider, the focused beam diameter d can be changed in a further wider range.

In accordance with the laser processing machine 100 according to an embodiment, any one of the Gaussian shape and the ring shape can be appropriately selected as the beam shape.

In accordance with the laser processing machine 100 according to an embodiment, the beam waist is adjusted according to the plate thickness and the material of the plate material W1, and then BPP is adjusted, thereby appropriately controlling a distribution of the power density of the laser beam with which the plate material W1 is irradiated. In accordance with the laser processing machine 100 according to an embodiment, the beam waist and the distribution of the power density are appropriately controlled to appropriately adjust the melting time and the cutting speed of the plate material W1, thereby improving the surface roughness of the cut surface of the plate material W1.

In accordance with the laser processing machine 100 according to an embodiment, the focused beam diameter d and the focal position can each be independently adjusted. In a case where it is not necessary to change the focal position, the position of the focusing lens 27 may be fixed, and only the convex lens 28 and the concave lens 30 may be configured to be movable.

The controller 50 may continuously adjust the focused beam diameter d according to the plate thickness of the plate material W1, or may adjust the focused beam diameter d in two steps by dividing the plate thickness into a thick plate having a plate thickness of 6 mm to 30 mm and a thin plate having a plate thickness of 0.1 mm to 6 mm, for example. Furthermore, the controller 50 may adjust the focused beam diameter d in three steps by dividing the plate thickness of the plate material into a thick plate having a plate thickness of 12 mm to 30 mm, a medium thick plate having a plate thickness of 2 mm to 12 mm, and a thin plate having a plate thickness of 0.1 mm to 2 mm. The controller 50 may adjust the focused beam diameter d in four or more steps by dividing the plate thickness of the plate material W1 into four or more groups.

In accordance with the laser processing machine 100 according to an embodiment, since the focused beam diameter d can be adjusted, the plate material W1 having a plate thickness in a predetermined range can be appropriately cut according to each plate thickness without replacing a component such as a lens or the like.

In accordance with the laser processing machine 100 according to an embodiment, it is sufficient that three lenses including the first lens (convex lens 28) having a positive focal length, the second lens (concave lens 30) having a negative focal length, and the third lens (focusing lens 27) having a positive focal length are provided. Accordingly, the configuration can be made to be simpler than the configuration described in Patent Literature 1, and a laser processing machine that can cut a plate material having a plate thickness in a predetermined range without replacing a component can be realized at a low cost.

In accordance with the laser processing machine 100 according to an embodiment, an appropriate cutting for the plate thickness can be realized, by configuring at least the first and second lenses so as to be freely movable.

The present invention is not limited to the above-described embodiment, and various modifications can be made without departing from the scope of the present invention.

INDUSTRIAL APPLICABILITY

The present invention can be used for cutting plate materials having a plurality of plate thicknesses using a laser beam.

The invention claimed is:

1. A laser processing machine comprising:
   a beam parameter product changer configured to vary beam parameter products of a laser beam emitted by a laser oscillator; and
   a beam diameter variable device configured to change a beam diameter of the laser beam emitted by the beam parameter product changer, wherein
   the beam parameter product changer sets beam parameter products of the laser beam to a predetermined value,
   the beam diameter variable device comprises:
   a first lens having a movement in an optical axis direction and having a positive focal length, and configured to convert divergent light of a laser beam emitted from an emission end of the laser beam into convergent beam light; and
   a second lens having a movement in the optical axis direction and having a negative focal length on which the convergent light is incident,
   the second lens is disposed toward the first lens side at a position shifted by the same distance as the focal length of the second lens from a point where the convergent light is focused when assuming that the second lens is not present, according to a position of the first lens in the optical axis direction, wherever the first lens is located, and is configured to convert the convergent light into parallel light, wherever the second lens is located,
   a third lens having a positive focal length, configured to focus the laser beam emitted from the beam diameter variable device, and to irradiate a plate material with the focused laser beam,
   a first mover for moving the first lens,
   a second mover for moving the second lens,
   a first mover driver configured to drive the first mover,
   a second mover driver configured to drive the second mover, and
   a controller configured to control the first and second mover drivers so as to drive the respective movements of the first and second lenses according to a processing condition of the plate material.

2. The laser processing machine according to claim 1, wherein the controller controls the beam parameter product changer so as to vary the beam parameter products of the laser beam.

3. The laser processing machine according to claim 1, wherein the controller controls the first and second mover drivers to increase a beam diameter of the laser beam incident on the third lens so as to decrease a focused beam diameter as a plate thickness of the plate material is thinner, and to decrease the beam diameter of the laser beam incident on the third lens so as to increase the focused beam diameter as a plate thickness of the plate material is thicker,
   and wherein even when the first and second mover drivers move the first lens and the second lens, respectively, a focal position of the laser beam emitted from the third lens and focused on the plate material is fixed.

4. The laser processing machine according to claim 1, wherein the third lens is configured to be movable in the optical axis direction, and to change a focal position of the laser beam.

5. The laser processing machine according to claim 4, further comprising:
   a third mover for moving the third lens;
   a third mover driver configured to drive the third mover; and
   wherein the controller is further configured to control the third mover driver so as to move the third lens, according to a processing condition of the plate material.

6. The laser processing machine according to claim 5, wherein the controller controls the beam parameter product changer so as to vary the beam parameter products of the laser beam.

7. The laser processing machine according to claim 5, wherein the first, second, and third movers are moving mechanisms comprising any one of a gear, a belt, a rack and pinion, a worm gear, and a ball screw, or an arbitrary combination thereof; and
   wherein the first, second, and third mover drivers are motors.

* * * * *